United States Patent [19]

Isobe

[11] Patent Number: 4,766,449

[45] Date of Patent: Aug. 23, 1988

[54] COLOR RECORDING MEDIUM PACKAGE

[75] Inventor: Minoru Isobe, Tokyo, Japan

[73] Assignee: Oki Electric Industry Co., Ltd., Tokyo, Japan

[21] Appl. No.: 111,518

[22] Filed: Oct. 21, 1987

[30] Foreign Application Priority Data

Oct. 29, 1986 [JP] Japan .......................... 61-164940[U]

[51] Int. Cl.[4] ........................................... G01D 15/00

[52] U.S. Cl. .................................... 346/150; 346/106

[58] Field of Search .......... 346/150, 105, 106, 76 PH, 346/76 R, 160.1; 400/120, 240.3, 240.4, 207, 208, 200, 201, 202, 198; 101/DIG. 13, DIG. 7, 336, 202, 111; 219/716 PH

[56] References Cited

U.S. PATENT DOCUMENTS 4,359,748 11/1982 Pasini et al. .................. 346/76 P H 4,651,167 3/1988 Moriguchi et al. ................ 346/106

*Primary Examiner*—Arthur G. Evans

*Attorney, Agent, or Firm*—Wenderoth, Lind & Ponack

[57] ABSTRACT

A color recording medium package for use on a heat transfer color printer in producing multicolor print. The color recording medium package comprises a recording sheet supporting member, a recording sheet supported on the recording sheet supporting member, an endless color ink ribbon having a plurality of color sections respectively coated with a plurality of color inks, and put on the recording sheet supporting member so as to extend for sliding movement around the recording sheet supporting member, a ribbon feed member associated with the color ink ribbon to locate the color sections sequentially in front of the recording sheet supported on the recording sheet supporting member, and a cassette accommodating the assembly of the recording sheet supporting member, the recording sheet, the color ink ribbon and the ribbon feed member. The color recording medium package is set in the printing station of the heat transfer color printer and the color ink ribbon is moved after a color pattern has been printed on the recording sheet by using one of the color sections to locate the next color section in front of the recording sheet for the subsequent printing operation. The color recording medium package is applicable also to an image taking system comprising an image taking device such as a camera, and a heat transfer color printer printing an image taken by the camera in a color print immediately after taking the image by the camera.

5 Claims, 3 Drawing Sheets

COLOR RECORDING MEDIUM PACKAGE

BACKGROUND OF THE INVENTION

1. Field of the Invention:

The present invention relates to a color recording medium package for use on a heat transfer color printer which prints characters and/or patterns on heat transfer color printing system.

2. Description of the Prior Art:

Heat transfer color printers print characters and/or patterns represented by printing data on a recording medium in color print by selectively heating the heating elements of a so-called thermal print head, namely, a heat print head, according to the printing data to heat-transfer fusible inks or hot-sublimable inks carried on a color ink ribbon sequentially to the recording medium. The uses of heat transfer color printers have progressively expanded in recent years and heat transfer color printers have been applied to various purposes.

The heat transfer color printer of such a kind, in general, is loaded individually with a recording sheet and a color ink ribbon, and hence there is not any relation between feeding the recording sheet and changing the color ink ribbon. Accordingly, a necessary amount of recording sheets and a necessary amount of color ink ribbons are reserved for using the heat transfer color printer.

However, it happens on occasions that the depletion of the reserve of recording sheets or color ink ribbons is unnoticed. If either recording sheets or color ink ribbons are depleted, the printing operation is obliged to be interrupted. That is, the heat transfer color printer is unable to function for printing operation when either the recording sheet or the color ink ribbon is depleted, nevertheless, the recording sheets and the color ink ribbons are handled individually in supplying the same to the heat transfer color printer, and hence it is possible that the heat transfer color printer is unable to function due to failure in the sufficient reservation of both the recording sheets and the color ink ribbons despite the heat transfer color printer being free from malfunction.

Under the recent situation where heat transfer color printers are used not only for business purposes but also for private purposes for producing color hard copies for various information, in particular, it is possible that the individual supply for recording sheets and color ink ribbons causes deficiency in the supply of either recording sheets or color ink ribbons. Furthermore, individual operations for feeding a recording sheet and for loading and changing a color ink ribbon require a troublesome work.

SUMMARY OF THE INVENTION

The present invention has been made to solve the foregoing problems in the conventional heat transfer color printer.

Accordingly, it is a principal object of the present invention to provide a color recording medium package integrally carrying a color ink ribbon and a recording sheet.

To achieve the object of the invention, the present invention provides a color recording medium package comprising: a recording sheet supporting member supporting a recording sheet; an endless color ink ribbon having a plurality of color sections to which a plurality of fusible or hot-sublimable color inks are applied, respectively, and surrounding the recording sheet supporting member with one of the color sections in alignment with the recording sheet; a ribbon feed member combined with the endless color ink ribbon so as to feed the color ink ribbon; and a cassette accommodating the assembly of the recording sheet supporting member, the color ink ribbon and the ribbon feed member.

When the color recording medium package of the present invention is loaded on a heat transfer color printer at the printing station, the color ink ribbon is exposed through an opening formed in the cassette to the thermal print head of the heat transfer color printer. The thermal print head heat-transfers the ink of the color section facing the recording sheet selectively to the recording sheet according to control signals to print an image of a color corresponding to the color section on the recording sheet. Then, the ribbon feed member is driven for feeding the color ink ribbon by the driving mechanism of the heat transfer color ink ribbon by the driving mechanism of the heat transfer color printer so that the next color section is brought opposite to the recording sheet, and then the thermal print head is operated according to control signals to print an image of a color corresponding to the next color section on the same recording sheet. Thus, a series of the printing operation and the color ink ribbon feeding operation is repeated to form a multicolor print on the recording sheet. After the multicolor print has been formed on the recording sheet, the recording medium package is removed from the heat transfer color printer, and then the recording sheet carrying the multicolor print is taken out from the color recording medium package.

Thus, according to the present invention, both the color ink ribbon and the recording sheet are handled simultaneously, so that the deficiency of either the color ink ribbon or the recording sheet will never occur, and hence the interruption of the printing operation due to the deficiency of either the color ink ribbon or the recording sheet is prevented.

Furthermore, the simultaneous supply of the color ink ribbon and the recording sheet to the heat transfer color printer improves the accessibility of the heat transfer color printer.

The above and other objects, features and advantages of the present invention will become apparent from the following description taken in conjuction with the accompanying drawings.

DESCRIPTION OF THE PREFERRED EMBODIMENT

Figure 1:
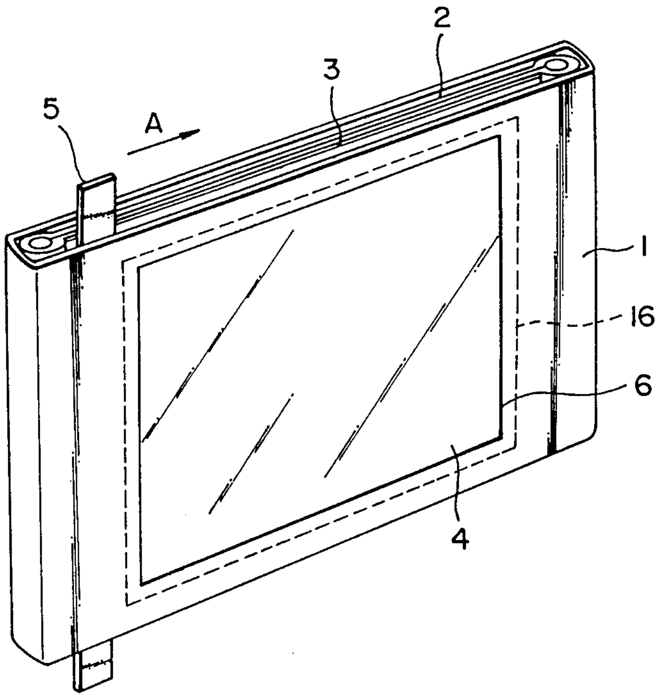
FIG. 1 is a perspective view of a color recording medium package, in a first embodiment, according to the present invention.

Referring to FIG. 1 showing a color recording medium package, in a first embodiment, according to the present invention, there are shown cassette 1, a recording sheet supporting member 2, a recording sheet 3, a color ink ribbon 4 and a ribbon feed member 5.

Figure 2:
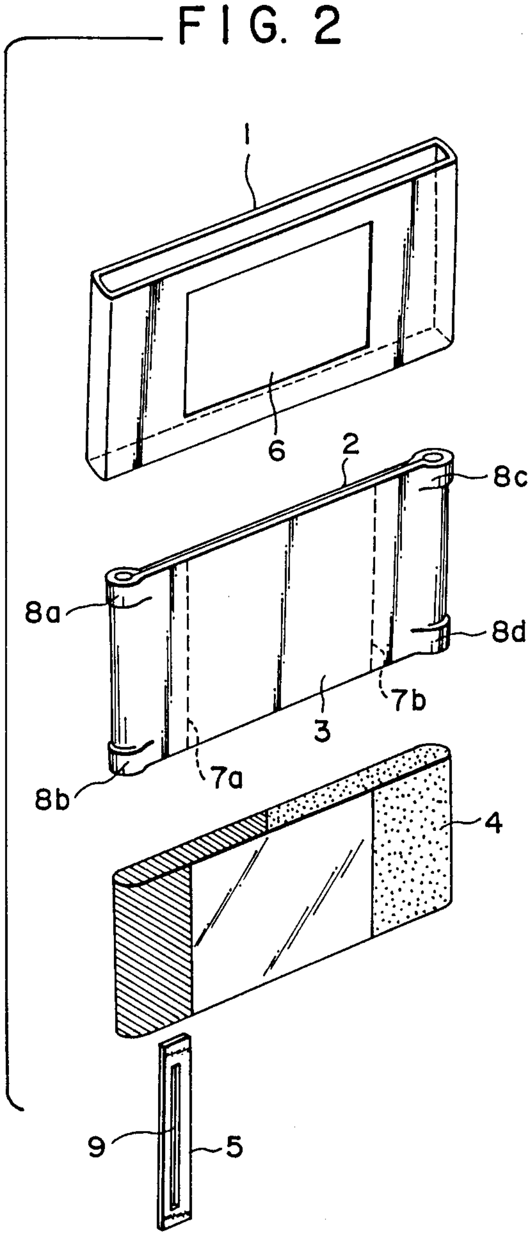
FIG. 2 s an exploded perspective view of the color recording medium package of FIG. 1.

Referring to FIG. 2, the cassette 1 is formed in the shape of a flat tube having open upper and lower ends. An opening 6 of a size corresponding to that of the recording sheet 3 is formed in the front wall of the cassette 1.

In this embodiment, the recording sheet supporting member 2 and the recording sheet 3 are formed integrally of a single paper sheet in a flat shape or an endless shape, and the recording sheet supporting member 2 and the recording sheet 3 are demarcated by perforations *7a* and *7b* as shown in FIG. 2. The respective upper and lower ends of the opposite sides of the recording sheet supporting member 2 are bulged in a round shape to form guides 8*a*, 8*b*, 8*c* and 8*d* for supporting the color ink ribbon in place and for guiding the color ink ribbon when the same is moved around the recording sheet supporting member 2. Therefore, at least portions of the opposite sides of the recording sheet supporting member 2 extending between the guides 8*a* and 8*b*, and between the guides 8*c* and 8*d* are finished through an antifriction treatment to enable smooth sliding movement of the color ink ribbon 4.

The width of the color ink ribbon 4 is substantially the same as intervals between the guides 8*a* and 8*b* and between the guides 8*c* and 8*d*. The endless color ink ribbon 4 is put on the recording sheet supporting member 2 supporting the recording sheet 3 so as to extend around the recording sheet supporting member 2. The inner surface of the color ink ribbon 4 are divided into a plurality of color sections, and the color sections are coated with a plurality of fusible or hot-sublimable color inks, respectively. In this embodiment, the color ink ribbon 4 is divided into three color sections coated with an yellow ink, a cyan ink and a magenta ink, respectively. The length of each color section corresponds to the length, namely, the horizontal length as viewed in FIG. 2, of the recording sheet 3.

The ribbon feed member 5 is an elongate plate having a length greater than the width, namely, the vertical length as viewed in FIG. 1, of the cassette 1. The ribbon feed member 5 has a slit 8 for receiving the color ink ribbon 4 therethrough. In forming the endless color ink ribbon 4, one end of the color ink ribbon 4 is passed through the slit 9 and then is connected to the other end of the same. The ribbon feed member 5 engages the color ink ribbon 4 when it is moved horizontally in one direction and disengages the color ink ribbon 4 when it is moved horizontally in the opposite direction.

In assembling the color recording medium package, the color ink ribbon 4 passed through the slit 8 of the ribbon feed member 5 is put on the recording sheet supporting member 2 supporting the recording sheet 3 so as to extend around and closely along the surface of the recording sheet supporting member 2 between the guides 8*a* and between the guides 8*c* and 8*d* with the inner surface thereof coated with the color inks facing the surface of the recording sheet supporting member 2. Then, the assembly of the recording sheet supporting member 2, the recording sheet 3, the color ink ribbon 4 and the ribbon feed member 5 is inserted in the cassette 1 from above or from below the same to assemble the color recording medium package. In inserting the assembly in the cassette 1, the recording sheet surpporting member 2 is bent slightly. After the assembly has been put in place in the cassette 1, the recording sheet supporting member 2 restores its original shape flexibly to press the guides 8*a*, 8*b*, 8*c* and 8*d* against the inner surface of the cassette 1, so that the assembly of the recording sheet supporting member 2, the recording sheet 3, the color ink ribbon 4 and the ribbon feed member 5 is held firmly in the cassette 1.

The color recording medium package is assembled so that only one of the color sections of the color ink ribbon 4, the yellow color section coated with an yellow ink in this embodiment, coincides with the opening 6, hence with the recording sheet 3 and so that the ribbon feed member 5 is located near one end (the left end in FIG. 1) of the recording sheet supporting member 2.

In use, the cassette 1 containing the recording sheet supporting member 2, the recording sheet 3, the color ink ribbon 4 and the ribbon feed member 5 is loaded removably at a predetermined position in the print station of the heat transfer color printer. Then, the thermal print head, not shown, of the heat transfer color printer is located opposite to the opening 6 of the cassette 1, and the driving mechanism of the heat transfer color printer engages one end of the ribbon feed member 5 projecting from the cassette 1.

Then, the thermal print head is driven to heat the heating elements thereof according to yellow pattern print data to heat-transfer the color ink coating the color section facing the recording sheet 3, the yellow ink, in this embodiment, to the recording sheet 3 in a yellow pattern corresponding to the yellow pattern print data. After the printing operation for printing the yellow pattern on the recording sheet 3 has been accomplished, the driving mechanism moves the ribbon feed member 5 in a direction indicated by an arrow A in FIG. 1. When moved in the direction of the arrow A, the ribbon feed member 5 engages the color ink ribbon 4 to move the color ink ribbon 4 therewith, whereby the color ink ribbon is moved so that the next color section, the cyan color section in this embodiment, coincides with the opening 6, hence with the recording sheet 3. Then, the ribbon feed member 5 is moved in the opposite direction by the driving mechanism to the initial position. When moved in the opposite direction, the ribbon feed member 5 disengages the color ink ribbon 4, so that the color ink ribbon 4 remains stationary. Thus, the color ink ribbon 4 is moved by a distance corresponding to the length of the color sections at each reciprocation of the ribbon feed member 5 to bring the next color section opposite to the recording sheet 3.

Then, the same printing operation is carried out according to cyan pattern data to heat-transfer the cyan ink by the thermal print head to the recording sheet 3 in a cyan pattern corresponding to the cyan pattern data.

Then the same ink ribbon feeding operation is performed to bring the magenta color section opposite to the recording sheet 3, and then the printing operation is carried out according to magenta pattern data to heat-transfer the magenta ink to the recording sheet 3 by the thermal print head in a magenta pattern corresponding to the magenta pattern data. Consequently, a multicolor print, namely, a composite color pattern consisting of the yellow, cyan and magenta patterns, is formed on the recording sheet 3.

After the printing operation for forming the multicolor print has thus been accomplished, the cassette 1 is removed from the print station of the heat transfer color printer, and then another color recording medium package is loaded in the print station of the heat transfer color printer.

After removing the color recording medium package from the heet transfer color printer, the recording sheet supporting member 2 is pulled out from the cassette 1, the color ink ribbon 4 is removed from the recording sheet supporting member 2, and then the recording sheet 3 is teared off at the perforations *7a* and *7b* to separate the recording sheet 3 carrying the multicolor print from the recording sheet supporting member 2.

The used recording sheet supporting member 2 and the used color ink ribbon 4 are thrown away, while the cassette 1 can be recycled for containing a new assembly of an unused recording sheet supporting member 2, an unused recording sheet 3, an unused color ink ribbon 4 and a ribbon feed member 5.

A color recording medium package, in a second embodiment, according to the present invention will be described hereinafter with reference to FIGS. 3 and 4. A cassette 1 and a color ink ribbon 4 employed in the second embodiment are the same as those of the first embodiment, and hence the cassette and color ink ribbon of the second embodiment are denoted by the same reference numerals and the description thereof will be omitted.

Figure 3:
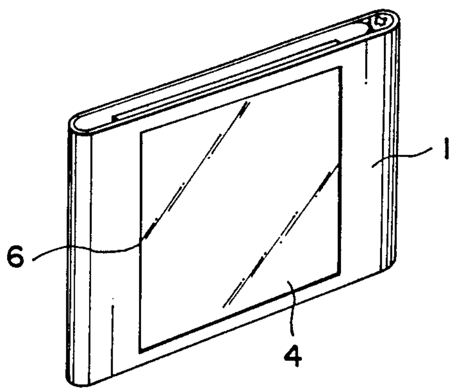
FIG. 3 is a perspective view of a color recording medium package, in a second embodiment, according to the present invention.
Figure 4:
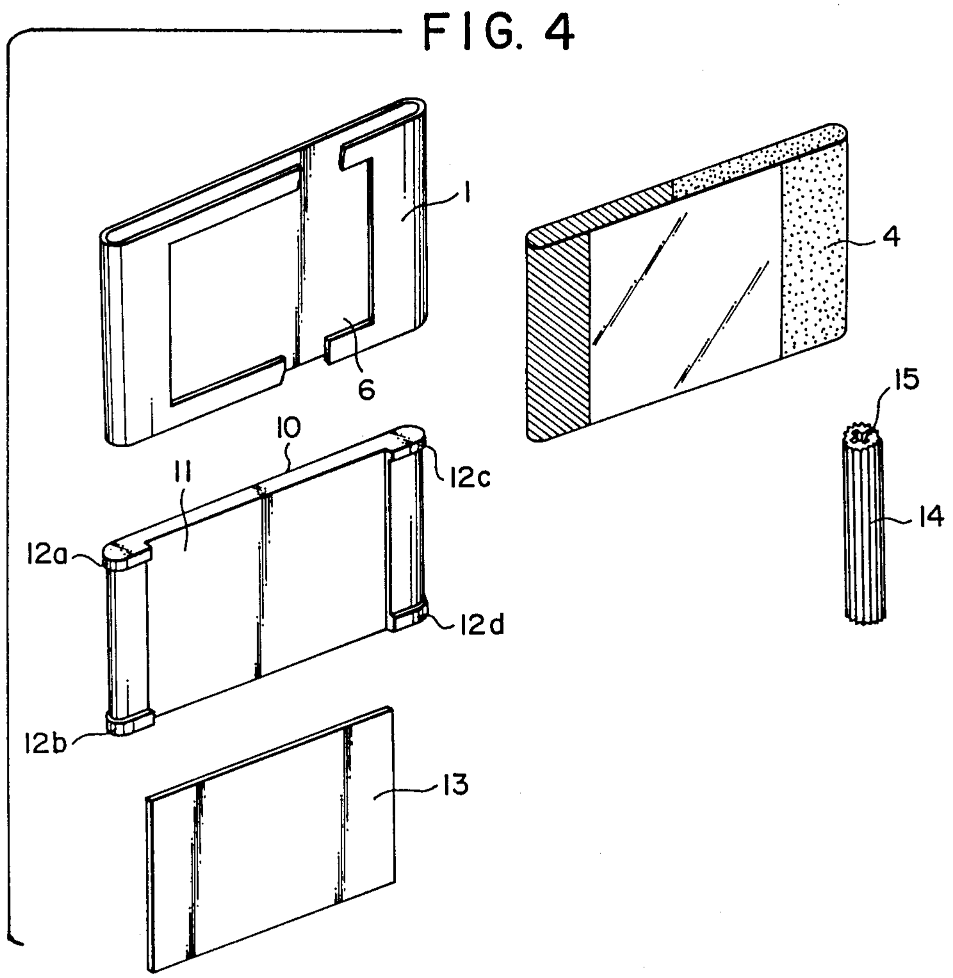
FIG. 4 is an exploded perspective view of the color recording medium package of FIG. 3.

Referring to FIGS. 3 and 4, a recording sheet supporting member 10 has, in the front surface thereof, a recess 11 of a shape and a size corresponding to those of a recording sheet 13. Round guides 12*a*, 12*b*, 12*c* and 12*d* each having a predetermined thickness are formed at the upper and lower corners of the right-hand and left-hand sides of the recording sheet supporting member 10. At least side portions of the recording sheet supporting member 10 between the round guides 12*a* and 12*b* and between the round guides 12*c* and 12*d*, namely, the side edges, are finished through an antifriction treatment.

A ribbon feed member 14 is a cylindrical member having a highly frictional surface and provided in the upper end face thereof with a cross recess 15 for receiving the driving member of the driving mechanism of the heat transfer color printer.

In assembling the color recording medium package, the recording sheet 13 is placed in the recess 11 of the recording sheet supporting member 10, then the color ink ribbon 4 is put on the recording sheet supporting member 10 so as to extend along the surface of the recording sheet supporting member 10 between the round guides 12*a* and 12*b* and between the round guides 12*c* and 12*d* with the inner surface thereof having color sections coated with color inks, respectively, facing the recording sheet supporting member 10. When the color ink ribbon 4 is put on the recording sheet supporting member 10, a fixed space for receiving the ribbon feed member 14 is formed between the color ink ribbon 4 and one side edge of the recording sheet supporting member 10. The ribbon feed member 14 is inserted in the space to complete the assembly of the recording sheet supporting member 10, the recording sheet 13, the color ink ribbon 4 and the ribbon feed member 14. Then, the assembly is inserted in the cassette 1 from above or from below the same.

In inserting the assembly in the cassette 1, the recording sheet supporting member 10 is bent slightly. After the assembly has been put in place within the cassette 1, the recording sheet supporting member 10 restores its original shape flexibly to press the guides 12*a*, 12*b*, 12*c* and 12*d* against the inner surface of the cassette 1, so that the assembly of the recording sheet supporting member 10, the recording sheet 13, the color ink ribbon 4 and the ribbon feed member 14 is held firmly in the cassette 1.

When the color recording medium package has been assembled, only one of the color sections of the color ink ribbon 4, for example, the yellow section, coincides with an opening formed in the front wall of the cassette 1 at a position corresponding to that of the recording sheet 13.

The manner of using the color recording medium package in the second embodiment and the mode of printing operation of the heat transfer color printer in printing a multicolor print by using the color recording medium package in the second embodiment are the same as those described hereinbefore with reference to the color recording medium package in the first embodiment, except that, in the second embodiment, the ribbon feed member 14 is rotated to bring the next color section to the printing position. When the cassette 1 containing the assembly of the rest of the components is loaded at a predetermined position in the print station of the heat transfer color printer, the driving member of the driving mechanism, not shown, of the heat transfer color printer engages the cross recess 15 of the ribbon feed member 14 to rotate the ribbon feed member 14, and thereby the color ink ribbon is driven frictionally by the ribbon feed member 14.

Although the foregoing embodiments of the present invention have been described as employing a color ink ribbon having three color sections, the number of the color sections is not limited to three; the color ink ribbon may have two or four or above color sections for color printing.

Furthermore, although the recording sheet supporting members 2 and 10 respectively employed in the foregoing embodiments are provided with guides 8*a* to 8*d* and guides 12*a* to 12*d*, respectively, at the upper and lower corners of both sides, the recording sheet supporting members 2 and 10 may be provided with guides only at the upper and lower corners of one side thereof.

Still further, the opening 6 of the cassette 1 may be covered with a removable cover 16 as indicated by broken lines in FIG. 1 to protect the color ink ribbon 4 and the recording sheet 2 during storage.

As apparent from the foregoing description, according to the present invention, the assembly of a recording sheet, a recording sheet supporting member, a color ink ribbon having a plurality of color sections respectively coated with color inks, and a ribbon feed member is contained in a cassette to form an integral color recording medium package for printing charactors and/or patterns in a multicolor print, and both the recording sheet and the color ink ribbon are loaded simultaneously in the print station of a heat transfer color printer simply by putting the cassette in place in the print station. Accordingly, a situation in which printing operation is impossible due to the lack of either the recording sheet or the color ink ribbon will never occur, and the integral color recording medium package facilitates handling the recording sheet and the color ink ribbon and improves the accessibility of the heat transfer color printer.

Furthermore, the color recording medium package can be applied, similarly to the photographic paper package for the instant camera, to a picture taking system which comprises, in combination, a heat transfer color printer and a picture taking means such as a camera and is capable of converting an image into electric signals and reproducing the image according to the electric signals in a print by the heat transfer color printer immediately after taking the image. In such an application, the heat transfer color printer need not be shielded from light only when the color recording medium package is protected from exposure to intense heat, which facilitates using such a picture taking system under natural radiation.

Although the invention has been described in its preferred forms with a certain degree of particularity, obviously many changes and variations are possible. It is therefore to be understood that the invention may be practiced otherwise than as specifically described without departing from the scope and spirit thereof.

What is claimed is:

1. A color recording medium package for use on heat transfer color printer which prints an image in a multicolor print by means of a thermal print head, said color recording medium package comprising:

- a recording sheet supporting member;
- a recording sheet supported on said recording sheet supporting member;
- an endless color ink ribbon having a plurality of color sections respectively coated with a plurality of fusible or hot-sublimable color inks and put on said recording sheet supporting member so that one of the plurality of color sections coincides with said recording sheet supported on said recording sheet supporting member;
- a ribbon feed member which is driven by driving means of the heat transfer color printer to locate the color sections of said color ink ribbon sequentially in front of said recording sheet, said ribbon feed member being moved by the driving mechanism of the heat transfer color printer after a color pattern has been printed by using one of the color sections of said color ink ribbon to locate the next color section of said color ink ribbon in front of said recording sheet;
- a cassette accommodating the assembly of said recording sheet supporting member, said recording sheet, said color ink ribbon and said ribbon feed member and having an opening in the front wall thereof at a position coinciding with said recording sheet to expose said recording sheet and the color section of said color ink ribbon facing said recording sheet to the thermal print head for printing.

2. A color recording medium package according to claim 1, wherein said recording sheet is formed integrally with said recording sheet supporting member, said recording sheet supporting member is provided with guide portions at least at the upper and lower corners of one side thereof to guide and position said color ink ribbon, and at least the side edge portions of said recording sheet supporting member are finished through an antifriction treatment.

3. A color recording medium package according to claim 1, wherein said recording sheet supporting member has a recess for supporting said recording sheet in the front surface thereof, said recording sheet supporting member is provided with guide portions at least at the upper and lower corners of one side thereof to guide an position said color ink ribbon, and at least one side edge portions of said recording sheet supporting member are finished through an antifriction treatment.

4. A color recording medium package according to claim 1, wherein a slit is formed in said ribbon feed member so that the ribbon feed member engages said color ink ribbon to move said color ink ribbon together therewith when moved in one direction along said recording sheet and so that the ribbon feed member disengages said color ink ribbon when moved in the opposite direction to leave said color ink ribbon stationary regardless of the movement of the ribbon feed member.

5. A color recording medium package according to claim 1, wherein said ribbon feed member is a cylindrical member which is rotated by driving means of the heat transfer color printer to locate the color sections of said color ink ribbon sequentially in front of said recording sheet.

* * * * *